Figure 1A:
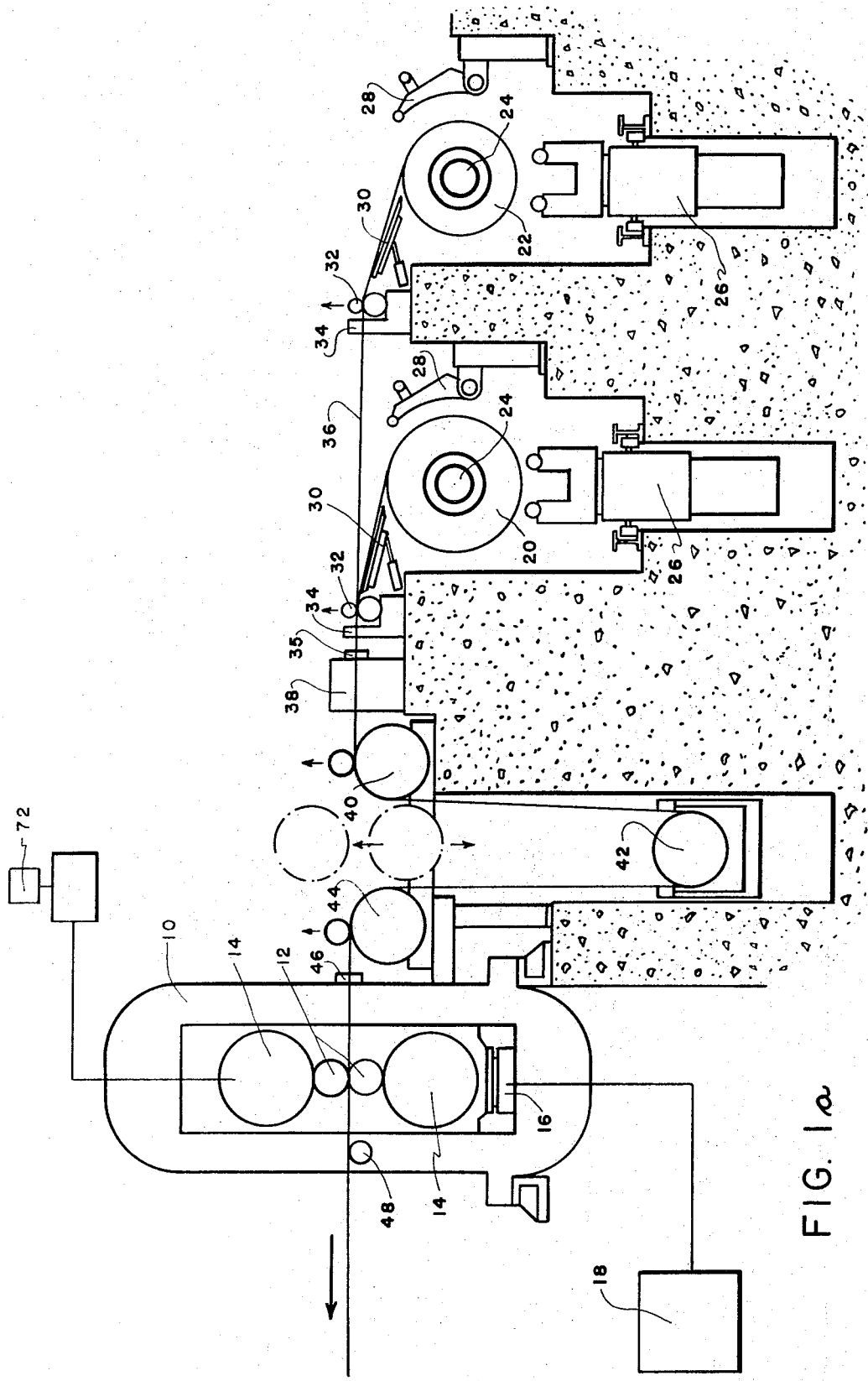

United States Patent [19]

Shumaker

[11] 3,835,681

[45] Sept. 17, 1974

[54] CONTINUOUS ROLLING MILL

[75] Inventor: Charles Storer Shumaker, Glenshaw, Pa.

[73] Assignee: Wean United, Inc., Pittsburgh, Pa.

[22] Filed: Mar. 16, 1973

[21] Appl. No.: 341,815

[52] U.S. Cl. ........................... 72/10, 72/234, 72/366, 29/33 B, 29/475
[51] Int. Cl. ............................................. B21b 1/28
[58] Field of Search ............. 29/33 B, 475; 72/6, 16, 72/9, 17, 14, 15, 10, 234, 3, 4, 5, 366, 199

[56] References Cited
UNITED STATES PATENTS

| | | | |
|---|---|---|---|
| 3,057,056 | 10/1962 | Foley et al. | 29/33 B |
| 3,281,917 | 11/1966 | Teplitz | 29/33 B |
| 3,584,853 | 6/1971 | Munson | 72/17 X |

*Primary Examiner*—Milton S. Mehr
*Attorney, Agent, or Firm*—Henry C. Westin; Daniel Patch

[57] ABSTRACT

The disclosure of this invention relates to a rolling mill arrangement that will enable coils of strip to be rolled uninterruptedly for an indefinite period of time. It illustrates a pair of payoff reels for quickly feeding succeeding coils to a spot welder or stitcher for joining succeeding coils, the time required to do this very rapid operation without interrupting the operation of the rolling mill being provided for by a single looper roller arrangement located after the welder and before the rolling mill. The mill includes a very rapid work roll separating hydraulic control that permits the weld or stitched portion of the two strips without being rolled to pass between the work rolls after which the rolls are quickly reset for rolling and tension may be quickly reestablished. If the mill includes more than one roll stand, each stand is quickly opened to allow the weld or stitch to pass between the rolls and then close to commence rolling and tensioning of the strip. At the delivery end of the mill the weld or stitch may be cut out on the fly by a flying shear without interrupting the operation of the mill.

8 Claims, 2 Drawing Figures

CONTINUOUS ROLLING MILL

Several attempts have been recently made to enable a tandem cold mill to operate on a continuous basis, i.e., coils, instead of being fed to and rolled separately by the mill are joined together so that a continuous and indefinite length of strip is fed to the mill. These attempts have provided extremely elaborate and costly strip storage equipment at the front end of the mill, particularly in rolling steel, to provide the necessary time to flash weld the coils prior to feeding to the first stand. Such flash welders not only involve considerable time, which greatly influences the required storage capacity of the strip storage equipment, but involve very sophisticated operations, such as thickness centering means for the strips, flash removal means and edge cornering means, that greatly add to the operational cost and the total coil preparation and welding time. Even in tandem mills that contemplate operating at a threading speed during passage of the weld through the mill, the storage equipment to date had to be designed to handle as much as 2,000 feet of stored strip.

On these mills, because of the interest in maximizing the yield of on-gauge strip, the strip was flash welded, trimmed, and then rolled so that off-gauge losses were attempted to be limited to the front portion of the strip between the last stand and the tension reel, in which only the untension portion would be off-gauge. There are, however, serious questions as to whether the high cost of providing the required storage capacity, welding equipment and controls in attempting to accomplish this are justified.

In addition to the costly and elaborate equipment and controls that such an arrangement required, they also required very costly and sophisticated weld tracking apparatus and controls, so that the operation of the mill, for example mill speed and strip tension, could be controlled with reference to the passage of the weld through the mill.

The present invention provides a method and apparatus for continually feeding strip to a rolling mill, in which the succeeding coils are joined together by a rapid joining means such as a spot welder or stitcher, in an operation that requires only a fraction of the time now required by present day flash welding of the mill, in which the mill on one or more stands thereof is provided with rapid work roll opening and closing equipment and controls that enable the joined portion of the strip to pass between the rolls, after which they are closed for rolling, and in which if a tandem mill is involved one or more including all the stands may be quickly opened and closed as a unit or each stand succeedingly as the joined portion of the two strips passing between the work rolls of the stands.

It is another object of the present invention to provide two coil payoff means at the entry side of the mill, means for preparing the leading end of a second coil for joining with a first coil by placement over or under the trailing end of the first coil while the first coil is being fed to the mill, a single looping roll arranged between a strip joining means and the first mill stand for storing strips sufficient to permit the mill to operate at a first rolling speed during the joining of the two strips, means for opening and closing each stand succeedingly as the joined portion passes through each stand of the mill at said first speed, means at the delivery side of the mill for shearing out the joined portion of the strip at said first speed and for coiling the leading and trailing ends of the sheared strip, and thereafter means for changing the speed of the mill to a second relatively higher speed compared with said first speed.

Figure 1B:
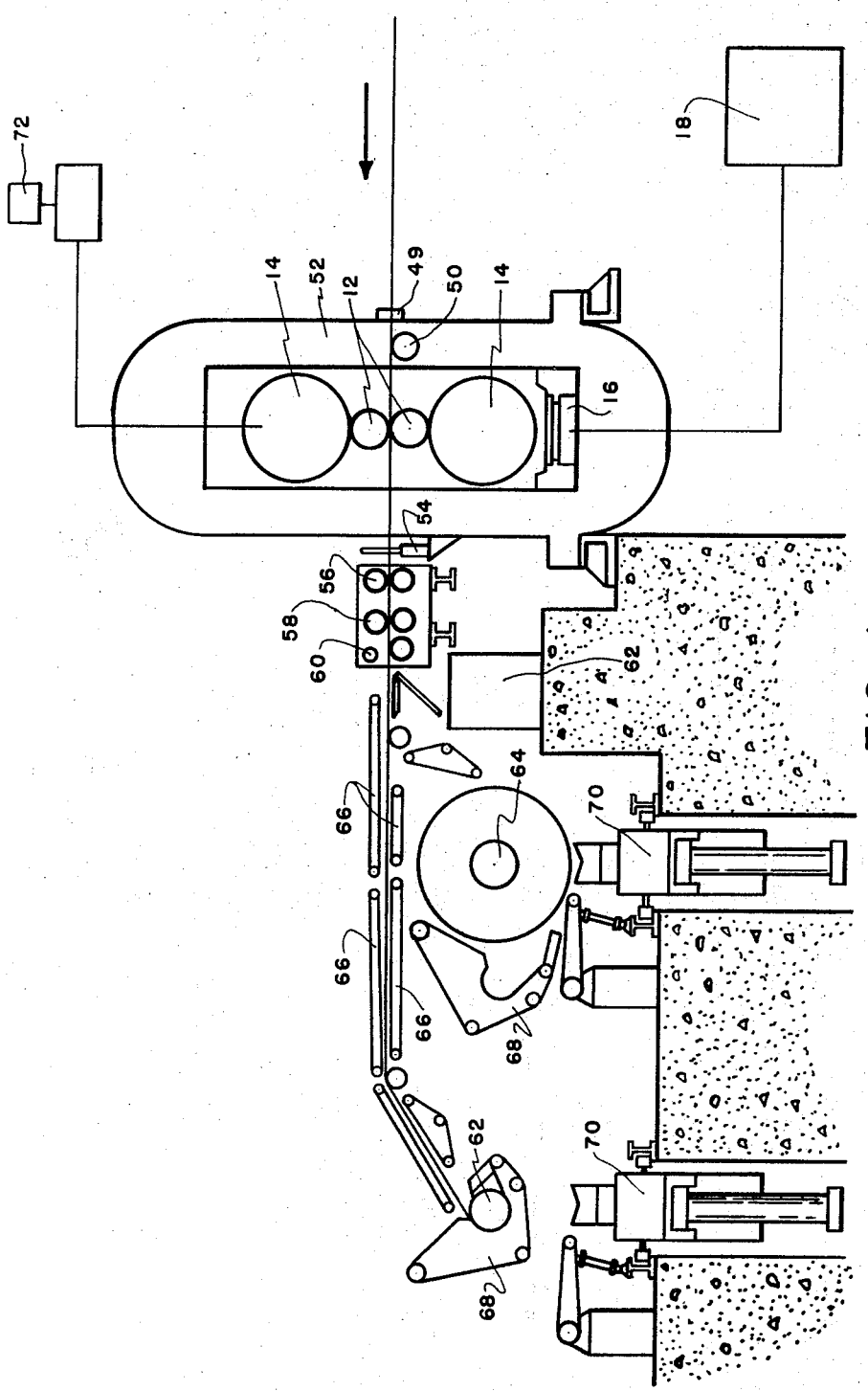

These objects, as well as other novel features and advantages of the present invention, will be better understood when the following description of one embodiment thereof is read along with the accompanying drawings of which:

FIG. 1a is an elevational view of the entry side of a cold tandem mill for rolling steel strip incorporating the features of the present invention, FIG. 1b is an elevational view of the delivery side of the mill partially illustrated in FIG. 1a including the last stand of the multi-stand rolling mill of FIG. 1a.

In referring to FIG. 1a, which as noted illustrates the entry side of a tandem cold mill, the first stand 10 being shown in the form of a 4 high stand having work rolls 12 and backup rolls 14. The stand 10 also includes a roll gap control hydraulic cylinder assembly 16 associated with a main gap control 18, the control being associated with each of the stands and in which the individual cylinders of the stands are capable of opening and closing the work rolls very rapidly, for example in a time of the order of 1 second per movement or quicker. Mild carbon steel coils 20 and 22 are fed to the mill 10 by payoff reels 24, each having a coil elevator 26 and strip guiding arms 28. The strip may range in gauge from .060 to .200 inches. The drawing shows the coil 22 being fed to the mill 10, in which the strip passes over an apron 30 through a pinch roll 32, edge guides 34, and over a retractable holding shelf 36. A similar arrangement of equipment is provided for the coil 20, and for this reason the same reference numbers have been applied to similar elements.

Following the guides 34 for the coil 20, there is provided a spot welder 38 for receiving a spot welding the trailing end of the coil 22 to the leading end of the coil 20. The advantage of using a spot welder, which may follow the designs of well known available units is found essentially in the economy and rapidness at which the strip welding can be accomplished and in the fact that there is no need of preparing and positioning the leading ends. The entire spot welding operation for the intended purpose employing a single row of 30 welds for an 80 inch wide strip can be performed in 3 seconds or less since the strip need only be brought to an over lap condition without the need of positioning and clamping the two strips. Edge guiding of the strip to the extent necessary will be provided by the units 34. In employing a spot welder, it should be noted that in most cases there will be generally no need to shear the ends of the coils and only the leading end may need shearing in rolling aluminum strip. Moreover, at reasonable threading speeds by anticipating the trailing end of the coil passing to the mill, the joining can be performed with only the need to stop the trailing end for several seconds.

In place of the spot welder 38, a stitcher may be employed resulting in even a quicker operation even in a case where a double row of stitches are desirable. A stitcher will be particularly advantageous in aluminum rolling mills and may follow the designs of well known available units. Two welders or stitchers can be employed arranged one behind the other so that when one is used the other can have maintenance performed on it and shifted in a direction normal to the path of travel of the strip when it is to be brought into use, while the other one at the same time will be shifted to one side or the other of the path of travel of the strip.

The strip of the coil 22 passes between the pinch rolls 32 and the guide 34 associated with the coil 20 through a trailing end detector 35, through the welder 38 and between the first of two sets of spaced apart pinch and guide rolls 40. The detector 35 is employed to initiate and control the operations of the welder 38 and the drives of the rolls 40. From the rolls 40 the strip passes around a single looping roll 42 arranged between the rolls 40 and the second set 44. The roll 42 is shown in full line at its maximum strip storage position providing for approximately 40 feet of storage capacity. This capacity is suited to serve a rolling mill operating at a threading speed for the last stand of 1,500 FPM and a welding time of 4 seconds. The phantom roll position of the roll 42 represents the strip threading position thereof.

Following the set of pinch rolls 44 and immediately before the first mill stand 10 of the tandem mill there is located a strip joint detector 46 for detecting the joint and sending a signal to the control 18 to provide for the proper timed opening out of rolling contact and closing into rolling contact of the work roll 12 of each stand as the joint passes between the open rolls 12.

FIG. 1a at the delivery side of the stand 10 shows a tensiometer roller 48, employed to measure and control the inter stand tension between two pair of adjacent stands. In the practice of the present invention the preceeding stand may be closed immediately after the over lap joint passes through the rolls 12 so that the strip between this stand and the next adjacent stand can be tensioned and rolled to gauge before the next adjacent stand is opened to allow the joined portion to pass between its work rolls.

In referring now to FIG. 1b, which as noted refers to the delivery side of the tandem mill, a joint detector 49 and a single tensiometer roller 50 is shown to the right of the last 4 high mill stand 52, which stand is similar to the stand 10 and for which reason the rolls and hydraulic cylinder are identified with the same reference numbers.

The strip passing from the stand 52 passes an x-ray 54, pinch roll 56, shear 58 and deflector pinch roll units 60, the latter being associated with a scrap box 62. The shear is designed to cut out on the fly and at a speed synchronized with the speed of the strip the joined section of the strips, in which case the trailing end is fed to one of the two tension reels 62 or 64 and the leading end is fed to the other tension reel. In the condition of the reels shown in FIG. 1b and the reel 64 has received the trailing end and the reel 62 the leading end. The shear 58 performs a cut on both sides of the joint, the upper roll of the pinch roll 60 being positioned so that after the first cut is made the joint is deflected to the scrap conveyor 62 and immediately thereafter the upper roll of the pinch roll 60 is shifted, to guide after the second cut is made, the leading end of the strip to a conveying belt 66 that services the reel 62. Each reel is provided with the usual belt wrapper 68 and coil handling equipment 70.

In now briefly describing the operation of the disclosed form of the present invention the mill may be supplied with its first strip by the coil 22 being uncoiled by the payoff reel 24. The looper roll 42 at this time will be in its phantom position shown in FIG. 1a and rolling to gauge at the threading speed of the mill, as set by a motor control 72, can commence as soon as tension can be established between the first and second stands and gap control effected by the control 18 and the hydraulic piston cylinders assemblies 16 thereof, and in the other stands similarly. Once tension is established between one of the tension reels 62 or 64 and the stand 52, which condition can be detected by means associated with the drives of the reels, the speed of the mill can be increased from the threading speed to the desired high production operating speed, for example, 6,000 FPM. The speed of the payoff reel 24 will be adjusted to allow the looper roll 42 to lower itself to its maximum storage position shown in full line in FIG. 1a.

The leading end of the coil 20 will be fed to the pinch roll 32, and then fed into the open spot welder 38 or open stitcher at a registered advance position controlled by a strip and/or rotation of the reel 24, just before the coil 22 is spent the mill speed will be lowered to the threading speed by the control 72 and the trailing end of the coil 22 as it passes from the reel 24 will be detected by the trailing end detector 35 prior to passing to spot welder 38. The detector 35 will first stop the trailing end of the coil 22 by stopping the drive of the pinch rolls 40, after which at a proper timed relationship, it will initiate the operation of the welder 38. The actual overlapping does not require any great deal of accuracy as to the extent of over lap of the leading end of the coil 20 and the trailing end of the coil 22 and at reasonable threading mill speeds will range between 6 to 12 inches. The most important requirement is that the ends of the strips are not allowed to protrude in a manner that would interfere with the guides etc. of the mill or other equipment as they pass through the mill and to the tension reels 62 and 64.

While the spot welding or stitching is being performed the mill will still roll to gauge by using the stored strip as stored by the looper roll 42. After welding, the new coil 20 will be rapidly fed into the mill by its payoff reel 24 and pinch roll 32 until the looper roll 42 has reached its necessary stored capacity after which the payoff reel speed will be equalized with the mill speed. The joint detector 46 will detect the overlap joint, before it passes to the mill and send a signal to the control 18 and open the work rolls 12 of the mill stand 10 to allow the joint to pass through without being rolled and then the rolls will be quickly closed to allow the stand to roll to gauge assuming tension is established between the stand 10 and the next stand. While in the preferred form this action will take place succeedingly for all remaining stands. As noted before in certain operations and mills, it may be desirable to open and close one or more stands on a unit, or the entire mill as a unit. At the delivery side of the mill the overlap joint will be cut out by the flying shear 58 and the leading end of the succeeding strip guided to one of the tension reels 62 or 64. As tension is established between the tension reel being employed and the mill stand 52 the speed of the mill can be increased to the desired operating speed.

In accordance with the provisions of the patent statues, I have explained the principle and operation of my invention and have illustrated and described what I consider to represent the best embodiment thereof.

I claim:

1. In a rolling mill having a number of cooperative tandemly arranged mill stands for rolling joined coils of strip, means for quickly opening and closing the work rolls of each stand,
  means for uncoiling separate coils to said mill,
  means for joining in the form of a spot welder or stitcher the trailing end of a first fed coil to the leading end of a second coil to be fed to said mill, control means for operating said work roll opening and closing means to either open one or more stands as a unit or each stand succeedingly, in both instances commencing with the stand or stands closest to the joining means, or the entire mill to allow the joined portion of the strips to pass between the open work rolls without being rolled thereby, and then to either quickly close one or more stands as a unit or each stand succeedingly, in both instances commencing with the stand or stands closest to the joining means, or the entire mill immediately after the joined portion has passed through the work rolls of said one or more stands or each stand or said entire mill.

2. In a rolling mill having a number of cooperative tandemly arranged mill stands for continually rolling joined coils of strip, means for quickly opening and closing the work rolls of each stand,
  means for establishing a first speed and a second speed substantially higher than the first speed for the mill,
  means for uncoiling separate coils to said mill,
  means for joining in the form of a spot welder or stitcher the trailing end of a first fed coil to the leading end of a second coil to be fed to said mill, means arranged between said mill and said joining means capable of storing strip sufficient to permit said joining means to join said coils while the mill is being operated at said first speed,
  control means operating during said first speed condition for opening said work roll opening and closing means to succeedingly open each mill stand commencing with the stand closest to the joining means to allow the joined portion of the strips to pass between the open work rolls without being rolled thereby and then to succeedingly close each mill stand to commence rolling quickly immediately after the joined portion is passed through the work rolls of each stand, and
  means after the strip has passed through the mill to change the speed of the mill from said first speed to said second speed.

3. In a rolling mill having a number of cooperative tandemly arranged mill stands for continually rolling joined coils of strip, means for quickly opening and closing the work rolls of each stand,
  means for establishing a first speed and a second speed substantially higher than the first speed for the mill,
  separate means for uncoiling separate coils to said mill,
  means for joining in the form of a spot welder or stitcher the trailing end of a first fed coil to the leading end of a second coil to be fed to said mill, a single roll strip looper means arranged between said mill and said joining means capable of storing strip sufficient to permit said joining means to join said coils while the mill is being operated at said first speed,
  control means operating during said first speed condition for opening said work roll opening and closing means to succeedingly open each mill stand commencing with the stand closest to the joining means to allow the joined portion of the strips to pass between the open work rolls without being rolled thereby and then to succeedingly close each mill stand to commence rolling quickly immediately after the joined portion is passed through the work rolls of each stand, and
  means after the strip has passed through the mill to change the speed of the mill from said first speed to said second speed.

4. In a rolling mill according to claim 3 wherein said means for quickly opening and closing said work rolls of each stand includes for each stand a rapidly operating hydraulic piston cylinder assembly.

5. In a rolling mill according to claim 3 including a flying shear means at the delivery side of said mill operated at said first speed condition for cutting out the joined portion of the strips, and separate means for coiling the portion of the strip preceding the cutout portion and for coiling the portion of the strip following the cutout portion.

6. In a method of operating a rolling mill having a number of cooperative tandemly arranged mill stands for rolling joined coils of strip, the steps of:

uncoiling a first coil of strip to a strip joining means in the form of a spot welder or stitcher arranged between a coil uncoiling means and said mill,
  feeding the trailing end of said first coil to said strip joining means,
  feeding the leading end of a second coil to said strip joining means,
  spot welding or stitching the two ends together, opening the work rolls of either one or more stands as a unit or each stand succeedingly, in both instances commencing with the stand or stands closest to said joining means, or the entire mill to allow the joined portion of the strips to pass between the open work rolls without being rolled thereby, and then quickly closing either one or more stands as a unit or each stand succeedingly, in both instances commencing with the stand or stands closest to the joining means, or the entire mill immediately after the joined portion has passed through the work rolls of said one or more stands or each stand or said entire mill, and
  establishing tension between succeeding pairs of closed stands and rolling to gauge in each stand once tension in the stand is established.

7. In a method of operating a rolling mill having a number of cooperative tandemly arranged mill stands for continually rolling joined coils of strip, the steps of:

uncoiling a first coil of strip to said mill,
  causing a portion of strip to be stored between the mill and a strip joining means in the form of a spot welder or stitcher arranged between said coil and said mill, the amount of stored strip being sufficient to permit said joining means to join coils while the mill is being operated at a first speed, operating said mill at said first speed while the leading end of said first coil is fed to the mill, thereafter increasing the speed of the mill to a second speed which speed is substantially greater than said first speed, before the strip of said first coil is completely fed to said mill reducing the speed of the mill to said first speed, feeding the trailing end of said first coil to said strip joining means, feeding the leading end of a second coil to said strip joining means, spot welding or stitching the two ends together while feeding the mill at said first speed with said stored strip, detecting the joined ends of said coils, and as a result thereof, and while the mill is still being operated at said first speed, opening the work rolls of each of said stands in succession commencing with the stand closest to the joining means to allow the joined portion of the strips to pass between the open work rolls without being rolled thereby and then to succeedingly close each mill stand to commence rolling quickly immediately after the joined portion is passed through the work rolls of each stand, and establishing tension between succeeding pairs of closed stands and rolling to gauge in each stand once tension in the stand is established.

8. In a method of operating a rolling mill having a number of cooperative tandemly arranged mill stands for continually rolling joined coils of strip, the steps of:

uncoiling a first coil of strip to said mill, causing a single loop of strip to be formed and stored between the mill and a strip joining means in the form of a spot welder or stitcher arranged between said coil and said mill, the amount of stored strip being sufficient to permit said joining means to join coils while the mill is being operated at a first speed, operating said mill at said first speed while the leading end of said first coil is fed to the mill, thereafter increasing the speed of the mill to a second speed which speed is substantially greater than said first speed, before the strip of said first coil is completely fed to said mill reducing the speed of the mill to said first speed, feeding the trailing end of said first coil to said strip joining means, feeding the leading end of a second coil to said strip joining means, spot welding or stitching the two ends together while feeding the mill at said first speed with said stored strip, detecting the joined ends of said coils, and as a result thereof, and while the mill is still being operated at said first speed, opening the work rolls of each of said stands in succession commencing with the stand closest to the joining means to allow the joined portion of the strips to pass between the open work rolls without being rolled thereby and then to succeedingly close each mill stand to commence rolling quickly immediately after the joined portion is passed through the work rolls of each stand, and establishing tension between succeeding pairs of closed stands and rolling to gauge in each stand once tension in the stand is established.

* * * * *